US006532042B1

(12) United States Patent
Kim

(10) Patent No.: US 6,532,042 B1
(45) Date of Patent: Mar. 11, 2003

(54) CLOCK SUPPLY DEVICE FOR USE IN DIGITAL VIDEO APPARATUS

(75) Inventor: Byeong-Jin Kim, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 228 days.

(21) Appl. No.: 09/617,835

(22) Filed: Jul. 17, 2000

(30) Foreign Application Priority Data

Jul. 15, 1999 (KR) .............................................. 99-28696

(51) Int. Cl.[7] .............................. H04N 3/27; H04N 5/05
(52) U.S. Cl. ........................ 348/537; 348/512; 348/516; 348/524; 348/536; 348/537; 348/542
(58) Field of Search ................................ 348/554, 512, 348/516, 524, 536, 537, 541, 542, 547, 735, 555, 557, 558, 545; H04N 3/27, 5/05

(56) References Cited

U.S. PATENT DOCUMENTS

| | | | | | |
|---|---|---|---|---|---|
| 4,962,427 A | * | 10/1990 | Lunn et al. | ................... | 348/555 |
| 5,331,347 A | * | 7/1994 | Wu | .............................. | 348/536 |
| 5,914,757 A | * | 6/1999 | Dean et al. | ................... | 348/584 |
| 6,014,176 A | * | 1/2000 | Nayebi et al. | .............. | 348/539 |
| 6,037,994 A | * | 3/2000 | Bae | .............................. | 348/510 |
| 6,067,123 A | * | 5/2000 | Lee | .............................. | 348/554 |
| 6,069,666 A | * | 5/2000 | Lyons | ......................... | 348/512 |
| 6,091,458 A | * | 7/2000 | Jeon et al. | ................... | 348/554 |
| 6,204,884 B1 | * | 3/2001 | Lee | .............................. | 348/555 |
| 6,211,918 B1 | * | 4/2001 | Uwabata et al. | ............ | 348/458 |
| 6,229,573 B1 | * | 5/2001 | Sato et al. | ................... | 348/516 |
| 6,297,850 B1 | * | 10/2001 | Han et al. | ................... | 348/521 |
| 6,404,459 B1 | * | 6/2002 | Kitou et al. | ................ | 348/555 |

* cited by examiner

Primary Examiner—John Miller
Assistant Examiner—Brian Yenke
(74) Attorney, Agent, or Firm—Sughrue Mion, PLLC

(57) ABSTRACT

A clock generating device for use in a digital video apparatus generates display clock matching an input video format. The clock generating device generates a clock of a frequency which is a predetermined number of times greater than the clock necessary for displaying video signals having a respectively different format, frequency-divides the generated clock, phase-locks the obtained stable frequency and supplies corresponding display clock. Video signals of a respectively different format can be displayed into a single display format, to thereby provide an effect of displaying a video signal without degeneration of a picture quality.

13 Claims, 1 Drawing Sheet

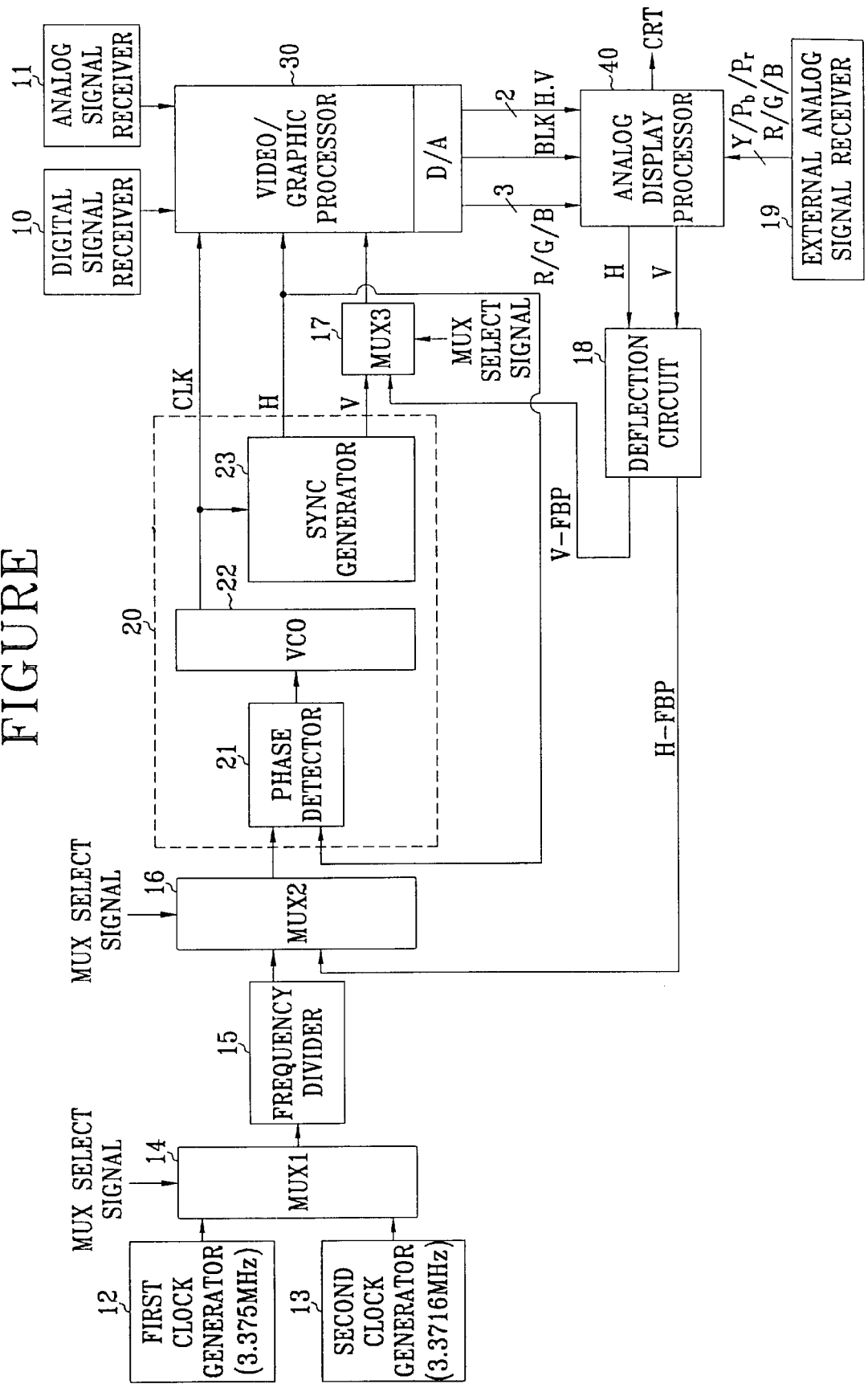

CLOCK SUPPLY DEVICE FOR USE IN DIGITAL VIDEO APPARATUS

BACKGROUND OF THE INVENTION

1. Field of the Invention

The present invention relates to a digital TV capable of receiving both a digital video signal and an analog video signal, and more particularly, to a device for supplying display clock which matches each format of a received video signal.

2. Description of the Related Art

A digital television (TV) requires various digital video signals to be displayed based upon a format of each digital video signal. Further, the digital TV should not only receive and display a conventional NTSC broadcasting, but should also receive an analog signal from other receivers such as a digital set-top-box and a digital video cassette recorder (VCR) and perform an on-screen-display (OSD) operation.

Standard digital TV specifications for the United States define eighteen kinds of formats for digital video signals. Thus, a digital broadcasting receiver receives and restores eighteen formats of video signals which can be transmitted, and then displays the same. Here, since there is a restriction that video signals of respectively different formats should be displayed on a single display device, an input video format is converted into a format which matches the display device to then be displayed. A currently adopted display video format utilizes a 1920H×1080V interlace method, wherein H is the number of horizontal pixels and V is the number of vertical scanning lines, and an actual signal becomes 2200H×1125V×60F in which F denotes a field. In this case, a clock frequency necessary for displaying a video signal becomes 74.25 MHz. Here, the clock of the necessary frequency is supplied by a crystal oscillator.

The digital broadcasting receiver having the above-defined display format can receive and display digital video signals of 60 fields and 59.94 fields. Further, the digital broadcasting receiver can receive and display an analog NTSC video signal whose standard frequency is 59.94 Hz. For this reason, one frame is missing every 1000 frames, resulting in a skip or repetition phenomenon of a signal which causes picture degeneration.

Meanwhile, the use of a graphic generator for an OSD operation is separately provided in the prior art. However, the digital TV can display an Electronic Program Guide (EPG) and Program Specific Information (PSI), by use of a video processor having a built-in graphic function. As a result, the digital TV cannot perform an OSD operation smoothly when it receives and displays an analog video signal of a 1080 interlace format from an external video signal receiver such as a set-top-box.

SUMMARY OF THE INVENTION

To solve the above problems, it is an object of the present invention to provide a device for generating a display clock which matches the different formats of received video signals.

To accomplish the above object of the present invention, there is provided a clock generating device for use in a digital video apparatus for displaying video signals having different input formats which are converted into a predetermined display format, the clock supply device comprising: a first clock generation unit for generating a clock of a frequency necessary for displaying video signals of a respectively different format which are received as digital and analog broadcastings; a second clock generation unit for generating a clock of a frequency necessary for displaying an externally received analog video signal of the same format as the display format; a phase locked loop (PLL) unit for phase-locking with a clock corresponding to a currently received video signal format between the clock frequencies generated from the first and second clock generators, and supplying a display clock for performing a display which matches the video signal format; and a display unit for format-converting the received video signal according to the display clock and displaying the format-converted result.

BRIEF DESCRIPTION OF THE DRAWINGS

The above object and other advantages of the present invention will become more apparent by describing the preferred embodiment thereof in more detail with reference to the accompanying drawing in which:

FIG. is a block diagram showing a clock supply device for use in a digital video apparatus according to the present invention.

DETAILED DESCRIPTION OF THE INVENTION

A preferred embodiment of the present invention will be described with reference to the accompanying drawing.

A digital video apparatus shown in the accompanying drawing includes a digital signal receiver 10 and an analog signal receiver 11 for receiving a digital broadcasting signal and an NTSC analog broadcasting signal, respectively. The digital broadcasting receiver 10 receives a digital video signal of 60 Hz and 59.94 Hz and the analog signal receiver 11 receives an NTSC analog video signal of 59.94 Hz. The clock supply device of the figure includes a first clock generator 12 for generating a clock having a frequency which is a predetermined times higher than a frequency of the clock necessary for displaying a received digital video signal of 60 Hz, and a second clock generator 13 for generating a clock having a frequency which is a predetermined times higher than a frequency of the clock necessary for displaying a digital video signal of 59.94 Hz and an NTSC analog video signal of 59.94 Hz. In addition, the clock supply device includes a first multiplexer (MUX1) 14 for selecting a clock signal of the clock signals generated from the first and second clock generators 12 and 13, respectively and outputting the selected result, and a frequency divider 15 for frequency-dividing the clock signal output from the first multiplexer 14 by 100. Here, the reason why the first and second clock generators 12 and 13 are set to generate clock signals at higher frequencies and then the frequency divider 15 frequency-divides the clock signals, is to secure a stable operating point of a crystal oscillator for generating the clock and to obtain a stable frequency. A second multiplexer (MUX2) 16 selects one of the clock divided in the frequency divider 15 and a horizontal flyback pulse (H-FBP) of a deflection circuit 18, and outputs the selected result to a PLL unit 20. The PLL unit 20 includes a phase detector 21, a voltage controlled oscillator (VCO) 22 and a sync generator 23. Meanwhile, the clock supply device includes a third multiplexer (MUX3) 17 for selecting one of a vertical frequency (V) generated from the sync generator 23 and a vertical flyback pulse (V-FBP) of the deflection circuit 18 and outputting the selected result, and a video/graphic processor 30 having a built-in digital-to-analog (D/A) converter for converting a currently received video signal into a predetermined display format, in accordance with clock CLK oscillating in the VCO 22, a horizontal frequency (H) generated from the sync generator 23 and the output of the third multiplexer 17. Further, the clock supply device includes an external analog signal receiver 19 for receiving an analog signal from an external device such as a set-top-box and an analog display processor 40 for separating a sync signal from the received external analog signal, performing a deflection signal processing, and outputting a signal to be displayed. The operation of the clock supply device for supplying a display clock matching a received video signal format in a digital video apparatus having the above-described structure will be described below in more detail.

The first clock generator 12 generates a clock having a frequency of 3.375 MHz in order to display a received digital broadcasting signal of 60 Hz. The second clock generator 13 generates clock having a frequency of 3.3716 MHz in order to display a received digital broadcasting signal of 59.94 Hz and a received NTSC analog broadcasting signal of 59.94 Hz. Each clock generated from the first and second clock generators 12 and 13 are input to the first multiplexer 14. The first multiplexer 14 selects one of the clock signals having the frequencies of 3.375 MHz and 3.3716 MHz, respectively, in accordance with a MUX select signal applied from a controller (not shown) and outputs the selected result to the frequency divider 15. The MUX select signal is determined according to a currently received video signal format.

First, the operation of generating a display clock matching a received digital video format of 60Hz will be described below.

The digital signal receiver 10 receives a digital video signal of 60 Hz having a format of 2200(H)×1125(V)×60(F). A horizontal clock frequency matching the received video format is 33.75 KHz, a vertical clock frequency thereof is 60 Hz and a display clock frequency is 74.25 MHz, The first multiplexer 14 selects the clock having the frequency of 3.375 MHz generated from the first clock generator 12, in accordance with a MUX select signal and outputs the selected result to the frequency divider 15. The frequency divider 15 divides the selected clock having the frequency of 3.375 MHz by 100 and outputs the clock of the frequency of 33.75 KHz to the second multiplexer 16. The second multiplexer 16 outputs the input clock of the frequency of 33.75 KHz to the phase detector 21 of the PLL unit 20, according to a MUX select signal applied from the controller (not shown). The phase detector 21 receives the clock of the 33.75 KHz frequency from the second multiplexer 16 and the horizontal frequency (H) generated from the sync generator 23. The phase detector 21 detects a phase difference between the two input signals and outputs the detected result to the VCO 22. The VCO 22 performs a voltage controlled oscillation by the detected phase difference and generates display clock CLK which matches the currently received video signal format. That is, the VCO 22 generates the clock of the 74.25 MHz frequency.

The sync generator 23 is implemented using a frequency divider circuit, and generates a horizontal sync signal for 44 clock duration every 2200 clock signals of the clock CLK supplied from the VCO 22 and a vertical sync signal for 45 horizontal sync signal duration every 1125 horizontal sync signals. The horizontal frequency (H) generated from the sync generator 23 is input to the phase detector 21 and the video/graphic processor 30. Further, the vertical frequency (V) generated from the sync generator 23 is input to the third multiplexer 17. The third multiplexer 17 supplies the vertical frequency (V) generated from the sync generator 23 to the video/graphic processor 30 according to the MUX select signal applied from the controller (not shown). The video/graphic processor 30 converts the digital video signal of 60 Hz received from the digital signal receiver 10 into an analog signal of the 1080 interlace format according to the clock CLK of the 74.25 MHz frequency oscillating from the VCO 22 in the PLL unit 20, using a built-in D/A converter. The analog signal of the 1080 interlace format is displayed on a CRT via an analog display processor 40.

Then, in the case that the digital signal receiver 10 or the analog signal receiver 11 receives a digital video signal of 59.94 Hz or an NTSC analog video signal of 59.94 Hz, the operation of generating clock which matches the format of the received video signal will be described below.

The video signal of 59.94 Hz has a format of 2200(H)×1125(V)×59.94(F). A horizontal clock frequency matching the received video format is 33.716 KHz, a vertical clock frequency thereof is 59.94 Hz and a display clock frequency is 74.175824 MHz.

The first multiplexer 14 selects the clock having the frequency of 3.3716 MHz generated from the second clock generator 13, in accordance with a MUX select signal and outputs the selected result to the frequency divider 15. The frequency divider 15 divides the selected clock having the frequency of 3.3716 MHz by 100 and outputs clock of the frequency of 33.716 KHz to the second multiplexer 16. The second multiplexer 16 outputs input clock of the frequency of 33.716 KHz to the phase detector 21 of the PLL unit 20, according to a MUX select signal. The following operation is same as the above-described case for 60 Hz. That is, the phase detector 21 detects a phase difference between the clock of the received 33.716 KHz frequency from the second multiplexer 16 and the horizontal frequency (H) clock feedback from the sync generator 23. The VCO 22 performs a voltage controlled oscillation by the detected phase difference and supplies display clock CLK of 74.175824 MHz. The sync generator 23 generates a horizontal sync signal for a 44 clock duration every 2200 clock signals of the clock CLK of 74.175824 MHz frequency supplied from the VCO 22. The sync generator 23 also generates a vertical sync signal for a 45 horizontal sync signal duration every 1125 horizontal sync signals. The operation of converting the received digital video signal or NTSC analog video signal into a 1080 interlace format, using clock CLK of the 74.175824 MHz supplied from the VCO 22 is same as the case of 60 Hz. Accordingly, the detailed description thereof will be omitted.

Next, the operation of generating clock matching the format will be described for the case where an external analog video signal of the same 1080 interlace format as the display format is received.

The external analog signal receiver 19 receives an analog video signal of the 1080 interlace format from an external device such as a set-top-box in the form of a color signal of red (R), green (G) and blue (B) or in the form of a luminance signal (Y) and two color difference signals (Pb, Pr). The analog display processor 40 receives the external analog signal of the 1080 interlace format to be received, separates the input analog signal into horizontal and vertical sync signals (H, V), and supplies the separated sync signals to the deflection circuit 18. The deflection circuit 18 performs a deflection operation in synchronization with the supplied horizontal and vertical sync signals (H, V) and outputs a horizontal flyback pulse (H-FBP) to the second multiplexer 16 and a vertical flyback pulse (V-FBP) to the third multiplexer 17. The second multiplexer 16 selects the horizontal flyback pulse (H-FBP) applied from the deflection circuit 18 according to the MUX select signal and outputs the selected result to the phase detector 21 of the PLL unit 20. Here, since the operation of the PLL unit 20 is same as the above-described one, the detailed description thereof will be omitted. The third multiplexer 17 selects the vertical flyback pulse (V-FBP) applied from the deflection circuit 18 according to the MUX select signal, and outputs the selected result to the video/graphic processor 30. The video/graphic processor 30 does not perform video processing but generates only a graphic signal and supplies the same to the analog display processor 40. The analog display processor 40 mixes the luminance signal and the color signal applied from the external analog signal receiver 19 with the graphic signal, using a blank signal BLK applied from the video/graphic processor 30. When such an external analog signal is input, a sync signal matching the external input signal and the clock locked with the sync signal should be supplied, and the external input signal is synchronized with the internal graphic signal.

As described above, the clock generating device for use in a digital video apparatus according to the present invention generates a clock matching a received video format, wherein a clock generated in correspondence to each format of the received video signals having a frequency which is predetermined number of times greater than the frequency required for displaying the video signals is frequency-divided, to thereby provide an effect of displaying a video signal without degeneration of a picture quality.

What is claimed is:

1. A clock generating device for use in a digital video apparatus for displaying video signals having different input formats which are converted into a predetermined display format, the clock generating device comprising:
   a first clock generation unit for generating a first clock having a first frequency required for displaying the video signals having the different input formats which are received as digital and analog broadcast signals;
   a second clock generation unit for generating a second clock having a second frequency required for displaying an analog video signal received from an external device, said analog video signal having a same format as the predetermined display format;
   a phase locked loop (PLL) unit for selectively receiving the first clock and the second clock corresponding to a format of a currently received video signal, and generating a display clock for performing a display which matches the format of the received video signal; and
   a display unit for format-converting the received video signal according to the display clock and displaying the format-converted result.

2. The clock generating device of claim 1, wherein said first clock generation unit comprises:
   a first clock generator for generating a first reference clock for displaying a video signal having a first format;
   a second clock generator for generating a second reference clock for displaying video signals having a second format and a third format, respectively; and
   a first multiplexer for selecting and outputting one of the first and second reference clock signals generated by said first and second clock generation units according to the currently received video format.

3. The clock supply generating of claim 2, wherein the first and second reference clocks generated by said first and second clock generators each have a frequency which is a predetermined number of times greater than the frequency required for displaying the video signals having the different input formats.

4. The clock generating device of claim 3, wherein said first clock generation unit further comprises a frequency divider for dividing a frequency of the output of said first multiplexer by a predetermined ratio to generate the first clock.

5. The clock generating device of claim 4, wherein said first clock generator generates the first clock having a frequency of 3.375 MHz frequency in order to display a digital video signal of 60 Hz.

6. The clock generating device of claim 5, wherein said second clock generator generates the second clock having a frequency 3.3716 MHz in order to display a digital video signal of 59.94 Hz and an NTSC analog video signal of 59.94 Hz.

7. The clock generating device of claim 6, wherein said frequency divider divides the frequency of the output of said first multiplexer by 100.

8. The clock generating device of claim 1, wherein said second clock generation unit generates horizontal and vertical deflection sync signals of the received external analog video signal.

9. The clock generating device of claim 2, further comprising a second multiplexer for selecting and outputting to the PLL unit one of the first clock generated by the first clock generation unit and the second clock generated by the second clock generation unit, according to a currently received video format.

10. The clock generating device of claim 9, wherein said PLL unit comprises:
   a phase detector for detecting a phase difference between the first or second clock output from said second multiplexer and a horizontal frequency clock which has been fedback to the phase detector;
   a voltage controlled oscillator for performing a voltage controlled oscillation based on the phase difference detected by the phase detector and generating the display clock; and
   a sync generator for generating the horizontal frequency clock and a vertical frequency clock which match a corresponding format of the received video signal in synchronization with the display clock generated by the voltage controlled oscillator.

11. The clock generating device of claim 10, further comprising a third multiplexer for selecting and outputting one of the vertical frequency clock generated by the sync generator and the second clock generated from the second clock generation unit, according to a currently received video format.

12. The clock generating device of claim 11, wherein said display unit comprises:
   a video/graphic processor for receiving the display clock, converting the received video signal into a display format, and outputting the converted result; and
   an analog display processor for separating a sync signal from the received external analog video signal, performing a deflection signal processing, and displaying the result.

13. The clock generating device of claim 12, wherein said analog display processor displays a graphic signal locked with the sync signal of the received external analog video signal on an on-screen-display (OSD).

* * * * *